(12) United States Patent
Wolman et al.

(10) Patent No.: US 6,968,342 B2
(45) Date of Patent: Nov. 22, 2005

(54) ENERGY MINIMIZATION FOR DATA MERGING AND FUSION

(76) Inventors: Abel Wolman, 855 NW. Lincoln St., White Salmon, WA (US) 98672; Jeff B. Glickman, 3230-8 E. Flamingo Rd., #1007, Las Vegas, NV (US) 89121

( * ) Notice: Subject to any disclaimer, the term of this patent is extended or adjusted under 35 U.S.C. 154(b) by 573 days.

(21) Appl. No.: 09/885,342

(22) Filed: Jun. 19, 2001

(65) Prior Publication Data

US 2002/0002555 A1 Jan. 3, 2002

Related U.S. Application Data

(63) Continuation of application No. PCT/US99/08768, filed on Apr. 21, 1999, and a continuation-in-part of application No. PCT/US98/27374, filed on Dec. 23, 1998.
(60) Provisional application No. 60/071,592, filed on Dec. 29, 1997.

(51) Int. Cl.[7] .............................................. G06F 17/30
(52) U.S. Cl. ....................................................... 707/102
(58) Field of Search ........................................ 707/102

(56) References Cited

U.S. PATENT DOCUMENTS

| | | | | | |
|---|---|---|---|---|---|
| 5,181,259 | A | * | 1/1993 | Rorvig ......................... | 382/225 |
| 5,321,613 | A | * | 6/1994 | Porter et al. ................... | 702/1 |
| 5,437,279 | A | * | 8/1995 | Gray ........................... | 600/427 |
| 5,590,345 | A | * | 12/1996 | Barker et al. .................. | 712/11 |
| 5,625,767 | A | * | 4/1997 | Bartell et al. ................. | 345/440 |
| 5,642,467 | A | * | 6/1997 | Stover et al. ................. | 700/250 |
| 5,706,402 | A | * | 1/1998 | Bell ............................ | 706/22 |
| 5,729,451 | A | * | 3/1998 | Gibbs et al. .................. | 702/12 |
| 5,774,357 | A | * | 6/1998 | Hoffberg et al. ............. | 713/600 |
| 5,986,673 | A | * | 11/1999 | Martz ......................... | 345/649 |
| 6,295,514 | B1 | * | 9/2001 | Agrafiotis et al. ............ | 703/12 |
| 6,421,612 | B1 | * | 7/2002 | Agrafiotis et al. ............ | 702/19 |
| 6,539,352 | B1 | * | 3/2003 | Sharma et al. ............... | 704/249 |

OTHER PUBLICATIONS

Carrol et al, Analysis of Individual Differences in Multidimensional Scaling via an N–Way Generalization of Eckart–Young Decomposition, Psychometrika, vol. 35, n. 3, Sep., 1970, pp. 283–319.

Fang, Disagreement degree of multi–person judgements in an additive structure, Mathematical Social Sciences 28 (1994) 85–111.

Busing et al, PROXSCAL: A multidimensional scaling program for i ndividual differences scaling with constraints, Advances in Statistical Software 6, 67–74, (1997), pp. 67–74.

Zhou et al, "A linearly constrained least squares approach for multisensor data fusion", SPIE vol. 3067, pp 118–129, Apr. 24–25, 1997.*

Sinha et al, "A General Clas of Appregation Operators with Applications to Information Fusion in Distributed Systems", 1989 IEEE Intel Conf on Systems, Man and Cybernetics, (Proc), Nov. 14–17, 1989, pp. 921–927.*

Gupta et al, Learning Collection Fusion Strategies, SIGIR '95, Seattle WA, 1995 acm 0–89714–6/95/07.*

Takane et al, Nonmetric Individual Differences Multidimensional Scalling: An Alternating Least Squares Method with Optmal Acaling Features, Psychometrika, vol. 42, Mar. 1977, No. 1.*

(Continued)

*Primary Examiner*—Wayne Amsbury
(74) *Attorney, Agent, or Firm*—Brinks Hofer Gilson & Lione

(57) ABSTRACT

A data merging/fusion comprises using a preprocessing step, an energy minimization step, and a postprocessing step to merge or fuse data. In a particular embodiment, ordinal data are processed by mapping the ordinal data to a lower triangular matrix of ordinal data, processing the matrix using non-metric individual differences multidimensional scaling and subsequently processing the result.

48 Claims, 7 Drawing Sheets

OTHER PUBLICATIONS

Baird, J. and Noma, E., "Fundamentals of Scaling and Psychophysics," John Wiley & Sons, 1978, chapter 10, "Multidimensional Scaling," pp. 177–205.

Blalock, Hubert M., "Social Statistics," McGraw–Hill, 1979, pp. 15–19, 31–81.

Borg, I. and Groenen, P., "Modern Multidimensional Scaling," Springer, 1997, pp. 15–26, 159–173.

Commandeur, J.J.F. and Heiser, W.J., "Mathematical derivations in the proximity scaling (PROXSCAL) of symmetric data matrices," RR–93–04, Dept. of Data Theory, University of Leiden, pp. 1–73.

De Leeuw, J. and Heiser, W., "Theory of multidimensional scaling," in Krishnaiah, P.R. and Kanal, L. N., Eds., "Handbook of Statistics, vol. 2," North Holland, (1982), pp. 285–316.

Kendall, D.G., "Seriation from abundance matrices," in Hodson, F.R., et al., "Mathematics in the Archaeological and Historical Sciences," Edinburgh University Press (1970), pp. 215–251.

McGee, V., "The Multidimensional Analysis of 'Elastic' Distances," in the British Journal of Mathematical and Statistical Psychology, vol. 19, part 2, Nov., 1966, pp. 181–196.

McGee, V., "Multidimensional scaling of N sets of similarity measures: a nonmetric individual differences approach," Multivariate Behavioral Research, Apr., 1968, pp. 233–248.

Roberts, F.S., "Limitations on conclusions using scales of measurement," in Pollock, S.M. et al., Eds., "Handbooks in OR & MS," vol. 6, Elsevier (1994), pp. 621–671.

Siegel, S. and Castellan, J., "Nonparametric Statistics For the Social Sciences," Second Ed., McGraw–Hill, 1988, pp. 22–36.

Stevens, S.S., "On the theory of scales of measurement," Science, vol. 103, No. 2684, Jun. 7 ,1946, pp. 677–680.

Takane, Y., et al., "Nonmetric individual differences multidimensional scaling: an alternating least squares method with optimal scaling features," Psychometrika, vol. 42, No. 1, Mar., 1997, pp. 7–67.

* cited by examiner

FIG.3

SIGNAL
△ SAWTOOTH
□ SQUARE
○ SINS

| | SEQUENCES |
|---|---|
| 1 | 1,1,1,1,1,1,1,1,1,1 |
| 2 | 1,2,3,4,5,6,7,8,9,10 |
| 3 | 1,2,3,5,8,13,21,34,55,89 |
| 4 | 1,1,1,1,2,2,2,2,2,2 |
| 5 | 1,2,3,5,6,7,8,9,10,11 |
| 6 | 1,2,3,5,8,13,20,33,53,86 |
| 7 | 1,1,1,-1,1,1,1,1,1,1 |
| 8 | 1,2,3,4,-1,6,7,8,9,10 |
| 9 | 1,2,3,5,8,-1,21,34,55,89 |

TABLE I

| DIMENSION | STRESS/ENERGY |
|---|---|
| 1 | 0.16004703 |
| 2 | 0.08933938 |
| 3 | 0.00000718 |
| 4 | 0.00000232 |
| 5 | 0.00003680 |
| 6 | 0.00006358 |

TABLE 2

ENERGY MINIMIZATION FOR DATA MERGING AND FUSION

CROSS REFERENCE TO RELATED APPLICATIONS

This application is a continuation of PCT International application No. PCT/US99/08768, filed Apr. 21, 1999, a continuation-in-part of PCT International application number PCT/US98/27374 filed Dec. 23, 1998 and designating the United States, which claims priority of U.S. provisional application serial No. 60/071,592, filed Dec. 29, 1997.

BACKGROUND OF THE INVENTION

The present invention relates generally to an iterative method for merging or fusing data acquired from varying sources or sensors. More particularly, the present invention relates to an iterative method of merging ordinal data which results in a ratio measurement level merged value.

Ordinal data is data which defines an ordering or ranks data in some order. In general, some data point is ranked first, another is ranked second, yet another is ranked third, and so on. The ranking is done with respect to some established criterion or criteria. The ranking may be based on an objective measurement or may be made subjectively.

Ordinal data while relatively uncommon in the physical sciences, is ubiquitous in the social sciences, psychology, psychometrics, economics, business and marketing and, indeed, in any activity or field of inquiry where data is gathered through means other than direct measurement. This includes data generated through surveys, expert assessments, preference ratings and rankings and through myriad other assessments of ordering, ranking or rating. A very simple example is the following: it is common practice in market research to assess customer product or service satisfaction through ratings surveys. In these surveys, customers are asked to rate some product or service, often on a scale of 1 to 5, across a number of categories or input domains. The result is a large set of ordinal data or alternatively, a set of sets of ordinal data. In general, further processing is required to make the ordinal data meaningfully usable. In particular, it is often desirable or required that the ordinal data be merged in some fashion and that this merged value be amenable to further quantitative or mathematical manipulation. The latter requirement means that the ordinal data must be converted to a more measurement-like or quantitative form. More formally, this is the problem of generating ratio scale data from ordinal scale data.

One known analytic technique for merging received ordinal data $\{x_1, \ldots x_n\}$ is through computing a weighted geometric mean $$GM(x_1, \ldots x_n) = \sqrt[w]{x_1^{w_1} x_2^{w_2} \ldots x_n^{w_n}}$$

where $w = w_1 + \ldots + w_n$ is the sum of the weights $w_1$ associated to the n ordinal values $x_i$. The geometric mean is preferred over a weighted mean or average for merging ordinal data, since, unlike the average, the geometric mean is invariant under order preserving transformations of the data. This means that the order of the geometric means, computed over a collection of ordinal data sets, is unaffected by order preserving transformations of the raw data. The geometric mean is the only meaningful analytic approach to merging ordinal data (Roberts, F. S. in *Handbooks in OR and MS*, vol. 6, eds. S. M. Pollock et al., Elsevier Science, New York, 1994). However, the geometric mean does not convert ordinal scale data to ratio scale data. The present invention offers an approximate or iterative technique for simultaneously merging and converting ordinal data into a ratio measurement level scalar.

PCT international application number PCT/US98/27374, filed Dec. 23, 1998 and designating the United States, is incorporated herein by reference. The incorporated application discloses an energy minimization technique for classification, pattern recognition, sensor fusion, data compression, network reconstruction and signal processing. The incorporated application shows a data analyzer/classifier which comprises using a preprocessing step, an energy minimization step and a post processing step to analyze and classify data. In a particular embodiment, the energy minimization is performed using individual differences multidimensional scaling. However, the incorporated application does not disclose an effective tool for merging or fusion of ordinal data.

Accordingly, there is a need for an improved method and apparatus for processing ordinal data.

BRIEF SUMMARY OF THE INVENTION

By way of illustration only, a sensor fusion or merging process comprises a collection of data structures, sources, or sensors, whose values are fused through energy minimization to create compressed representations of the input data structures, sources, or sensors. This includes a data fusion or merging process for ordinal or higher measurement level data that comprises using energy minimization with a collection of input source matrices. The data to be fused is data measured at ordinal or higher measurement levels including ranking or rating information (for definitions of measurement levels or scales, see Stevens, S. S., "On the Theory of scales of measurement," *Science*, 103, pp. 677–680, 1946). The data is mapped to a lower triangular or, equivalently, a hollow symmetric matrix (see Detailed Description section for definitions) and is processed by an energy minimization technique such as individual differences multidimensional scaling (IDMDS). Using the IDMDS output, the data are processed for presentation of information in a form usable by a human user or in a form suitable for further quantitative analysis. A single data value or vector of values may be produced to clearly display the quality, validity or other aspect of the input data. The components of this output vector are scalars thus facilitating further quantitative manipulation and analysis of the input data. The foregoing discussion of one embodiment has been presented only by way of introduction. Nothing in this section should be taken as a limitation on the following claims, which define the scope of the invention.

BRIEF DESCRIPTION OF THE DRAWINGS

FIG. 2 through FIG. 10 relate to examples illustrating use of an embodiment of the invention for data classification, pattern recognition, and signal processing.

DETAILED DESCRIPTION OF THE PRESENTLY PREFERRED EMBODIMENTS

Figure 1:
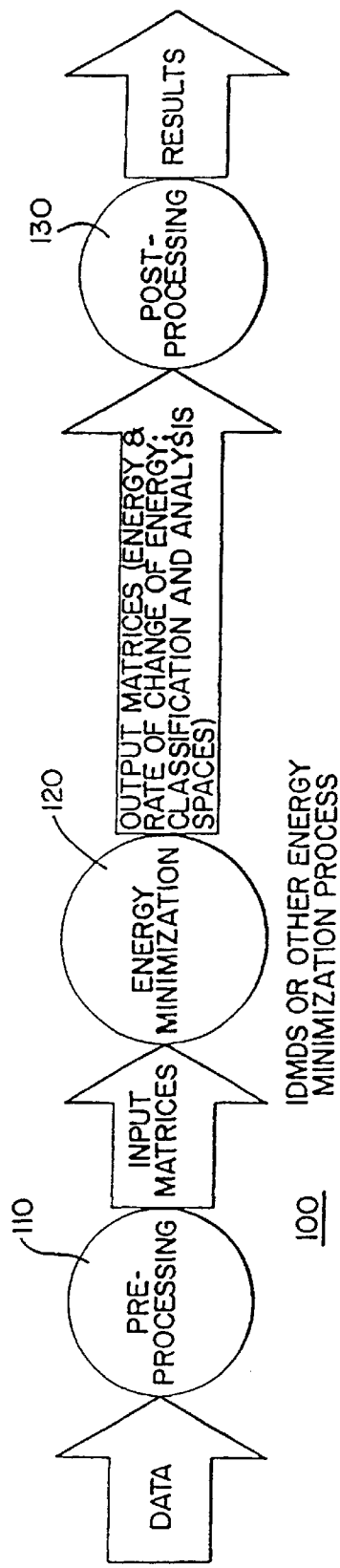
FIG. 1 is a diagram illustrating components of an analyzer according to the first embodiment of the invention.

The method and apparatus in accordance with the present invention provide an analysis tool with many applications. This tool can be used for data classification, pattern recognition, signal processing, sensor fusion, data compression, network reconstruction, and many other purposes. The invention relates to a general method for data analysis based on energy minimization and least energy deformations. The invention uses energy minimization principles to analyze one to many data sets. As used herein, energy is a convenient descriptor for concepts which are handled similarly mathematically. Generally, the physical concept of energy is not intended by use of this term but the more general mathematical concept. Within multiple data sets, individual data sets are characterized by their deformation under least energy merging. This is a contextual characterization which allows the invention to exhibit integrated unsupervised learning and generalization. A number of methods for producing energy minimization and least energy merging and extraction of deformation information have been identified; these include, the finite element method (FEM), simulated annealing, and individual differences multidimensional scaling (IDMDS). The presently preferred embodiment of the invention utilizes individual differences multidimensional scaling (IDMDS).

Multidimensional scaling (MDS) is a class of automated, numerical techniques for converting proximity data into geometric data. IDMDS is a generalization of MDS, which converts multiple sources of proximity data into a common geometric configuration space, called the common space, and an associated vector space called the source space. Elements of the source space encode deformations of the common space specific to each source of proximity data. MDS and IDNDS were developed for psychometric research, but are now standard tools in many statistical software packages. MDS and IDMDS are often described as data visualization techniques. This description emphasizes only one aspect of these algorithms.

Broadly, the goal of MDS and IDMDS is to represent proximity data in a low dimensional metric space. This has been expressed mathematically by others (see, for example, de Leeuw, J. and Heiser, W., "Theory of multidimensional scaling," in P. R. Krishnaiah and L. N. Kanal, eds., *Handbook of Statistics*, Vol. 2. North-Holland, New York, 1982) as follows. Let S be a nonempty finite set, p a real valued function on S×S, $$p: S \times S \to R.$$

p is a measure of proximity between objects in S. Then the goal of MDS is to construct a mapping $\hat{f}$ from S into a metric space (X, d), $$f: S \to X,$$

such that $p(i, j) = p_{ij} \approx d(\hat{f}(i), \hat{f}(j))$, that is, such that the proximity of object i to object j in S is approximated by the distance in X between $\hat{f}(i)$ and $\hat{f}(j)$. X is usually assumed to be n dimensional Euclidean space $R^n$, with n sufficiently small.

IDMDS generalizes MDS by allowing multiple sources. For $k=1, \ldots, m$ let $S_k$ be a finite set with proximity measure $p_k$, then IDMDS constructs maps $$f_k: S_k \to X$$

such that $p_k(i,j) = p_{ijk} \approx d(\hat{f}_k(i), \hat{f}_k(j))$, for $k=1, \ldots m$.

Intuitively, IDMDS is a method for representing many points of view. The different proximities $p_k$ can be viewed as giving the proximity perceptions of different judges. IDMDS accommodates these different points of view by finding different maps $\hat{f}_k$ for each judge. These individual maps, or their image configurations, are deformations of a common configuration space whose interpoint distances represent the common or merged point of view.

MDS and IDMDS can equivalently be described in terms of transformation functions. Let $P=(p_{ij})$ be the matrix defined by the proximity p on S×S. Then MDS defines a transformation function $$f: p_{ij} \mapsto d_{ij}(X),$$

where $d_{ij}(X) = d(\hat{f}(i), \hat{f}(j))$, with $\hat{f}$ the mapping from $S \to X$ induced by the transformation function f. Here, by abuse of notation, $X=\hat{f}(S)$, also denotes the image of S under $\hat{f}$. The transformation function f should be optimal in the sense that the distances $f(p_{ij})$ give the best approximation to the proximities $p_{ij}$. This optimization criterion is described in more detail below. IDMDS is similarly re-expressed; the single transformation f is replaced by m transformations $f_k$. Note, these $f_k$ need not be distinct. In the following, the image of $S_k$ under $f_k$ will be written $X_k$.

MDS and IDMDS can be further broken down into so-called metric and nonmetric versions. In metric MDS or IDMDS, the transformations $f(f_k)$ are parametric functions of the proximities $p_{ij}(p_{ijk})$. Nonmetric MDS or IDMDS generalizes the metric approach by allowing arbitrary admissible transformations f ($f_k$), where admissible means the association between proximities and transformed proximities (also called disparities in this context) is weakly monotone:

$$p_{ij} < p_{kl} \text{ implies } f(p_{ij}) \leq f(p_{kl}).$$

Beyond the metric-nonmetric distinction, algorithms for MDS and IDMDS are distinguished by their optimization criteria and numerical optimization routines. One particularly elegant and publicly available IDMDS algorithm is PROXSCAL See Commandeur, J. and Heiser, W., "Mathematical derivations in the proximity scaling (PROXSCAL) of symmetric data matrices," *Tech. report no. RR-93-03*, Department of Data Theory, Leiden University, Leiden, The Netherlands. PROXSCAL is a least squares, constrained majorization algorithm for IDMDS. We now summarize this algorithm, following closely the above reference.

PROXSCAL is a least squares approach to IDMDS which minimizes the objective function $$\sigma(f_1, \ldots, f_m, X_1, \ldots, X_m) = \sum_{k=1}^{m} \sum_{i<j}^{n} w_{ijk}(f_k(p_{ijk}) - d_{ij}(X_k))^2.$$

$\sigma$ is called the stress and measures the goodness-of-fit of the configuration distances $d_{ij}(X_k)$ to the transformed proximities $f_k(p_{ijk})$. This is the most general form for the objective function. MDS can be interpreted as an energy minimization process and stress can be interpreted as an energy functional. The $w_{ijk}$ are proximity weights. For simplicity, it is assumed in what follows that $w_{ijk}=1$ for all i,j,k.

The PROXSCAL majorization algorithm for MDS with transformations is summarized as follows.
1. Choose a (possibly random) initial configuration $X^0$.
2. Find optimal transformations $f(p_{ij})$ for fixed distances $d_{ij}(X^0)$.
3. Compute the initial stress $$\sigma(f, X^0) = \sum_{i<j}^{n}(f(p_{ij}) - d_{ij}(X^0))^2.$$

4. Compute the Guttman transform $\overline{X}$ of $X^0$ with the transformed proximities $f(p_{ij})$. This is the majorization step.
5. Replace $X^0$ with $\overline{X}$ and find optimal transformations $f(p_{ij})$ for fixed distances $d_{ij}$; $(X^0)$.

6. Compute $\sigma(f, X^0)$.
7. Go to step 4 if the difference between the current and previous stress is not less than $\epsilon$, some previously defined number. Stop otherwise.

For multiple sources of proximity data, restrictions are imposed on the configurations $X_k$ associated to each source of proximity data in the form of the constraint equation $X_k = ZW_k$.

This equation defines a common configuration space Z and diagonal weight matrices $W_k$. Z represents a merged or common version of the input sources, while the $W_k$ define the deformation of the common space required to produce the individual configurations $X_k$. The vectors defined by diag($W_k$), the diagonal entries of the weight matrices $W_k$, form the source space W associated to the common space Z.

The PROXSCAL constrained majorization algorithm for IDMDS with transformations is summarized as follows. To simplify the discussion, so-called unconditional IDMDS is described. This means the m transformation functions are the same: $f_1 = f_2 = \ldots = f_m$.
1. Choose constrained initial configurations $X_k^0$.
2. Find optimal transformations $f(p_{ijk})$ for fixed distances $d_{ij}(X_k^0)$.
3. Compute the initial stress $$\sigma(f, X_1^0, \ldots, X_m^0) = \sum_{k=1}^{m} \sum_{i<j}^{n} (f(p_{ijk}) - d_{ij}(X_k^0))^2.$$

4. Compute unconstrained updates $\overline{X}_k$ of $X_k^0$ using the Guttman transform with transformed proximities $f(p_{yk})$. This is the unconstrained majorization step.
5. Solve the metric projection problem by finding $X_k^+$ minimizing $$h(X_1, \ldots, X_m) = \sum_{k=1}^{m} tr(X_k - \overline{X}_k)^t (X_k - \overline{X}_k)$$

subject to the constraints $X_k = ZW_k$. This step constrains the updated configurations from step 4.
6. Replace $X_k^0$ with $X_k^+$ and find optimal transformations $f(p_{ijk})$ for fixed distances $d_{ij}(X_k^0)$.
7. Compute $\sigma(f, X_1^0, \ldots, X_m^0)$.
8. Go to step 4 if the difference between the current and previous stress is not less than $\epsilon$, some previously defined number. Stop otherwise.

Here, tr(A) and A' denote, respectively, the trace and transpose of matrix A.

It should be pointed out that other IDNDS routines do not contain an explicit constraint condition. For example, ALSCAL (see Takane, Y., Young, F, and de Leeuw, J., "Nonmetric individual differences multidimensional scaling: an alternating least squares method with optimal scaling features," *Psychometrika*, Vol. 42, 1977) minimizes a different energy expression (sstress) over transformations, configurations, and weighted Euclidean metrics. ALSCAL also produces common and source spaces, but these spaces are computed through alternating least squares without explicit use of constraints. Either form of IDMDS can be used in the present invention.

MDS and IDMDS have proven useful for many kinds of analyses. However, it is believed that prior utilizations of these techniques have not extended the use of these techniques to further possible uses for which MDS and IDMDS have particular utility and provide exceptional results.

Accordingly, one benefit of the present invention is to incorporate MDS or IDMDS as part of a platform in which aspects of these techniques are extended. A further benefit is to provide an analysis technique, part of which uses IDMDS, that has utility as an analytic engine applicable to problems in classification, pattern recognition, signal processing, sensor fusion, and data compression, as well as many other kinds of data analytic applications.

Referring now to FIG. 1, it illustrates an operational block diagram of a data analysis/classifier tool 100. The least energy deformation analyzer/classifier is a three-step process. Step 110 is a front end for data transformation. Step 120 is a process step implementing energy minimization and deformation computations—in the presently preferred embodiment, this process step is implemented through the IDMDS algorithm. Step 130 is a back end which interprets or decodes the output of the process step 120. These three steps are illustrated in FIG. 1.

It is to be understood that the steps forming the tool 100 may be implemented in a computer usable medium or in a computer system as computer executable software code. In such an embodiment, step 110 may be configured as a code, step 120 may be configured as second code and step 120 may be configured as third code, with each code comprising a plurality of machine readable steps or operations for performing the specified operations. While step 110, step 120 and step 130 have been shown as three separate elements, their functionality can be combined and/or distributed. It is to be further understood that "medium" is intended to broadly include any suitable medium, including analog or digital, hardware or software, now in use or developed in the future.

Step 110 of the tool 100 is the transformation of the data into matrix form. The only constraint on this transformation for the illustrated embodiment is that the resulting matrices be square. The type of transformation used depends on the data to be processed and the goal of the analysis. In particular, it is not required that the matrices be proximity matrices in the traditional sense associated with IDMDS. For example, time series and other sequential data may be transformed into source matrices through straight substitution into entries of symmetric matrices of sufficient dimensionality (this transformation will be discussed in more detail in an example below). Time series or other signal processing data may also be Fourier or otherwise analyzed and then transformed to matrix form.

Step 120 of the tool 100 implements energy minimization and extraction of deformation information through IDMDS. In the IDMDS embodiment of the tool 100, the stress function $\sigma$ defines an energy functional over configurations and transformations. The configurations are further restricted to those which satisfy the constraint equations $X_k = ZW_k$. For each configuration $X_k$, the weight vectors diag($W_k$) are the contextual signature, with respect to the common space, of the k-th input source. Interpretation of $\sigma$ as an energy functional is fundamental; it greatly expands the applicability of MDS as an energy minimization engine for data classification and analysis.

Step 130 consists of both visual and analytic methods for decoding and interpreting the source space W from step 120. Unlike traditional applications of IDMDS, tool 100 often produces high dimensional output. Among other things, this makes visual interpretation and decoding of the source space problematic. Possible analytic methods for understanding the high dimensional spaces include, but are not limited to, linear programming techniques for hyperplane and decision surface estimation, cluster analysis techniques, and generalized gravitational model computations. A source space dye-dropping or tracer technique has been developed for both source space visualization and analytic postprocessing. Step 130 may also consist in recording stress/energy, or the rate of change of stress/energy, over multiple dimensions. The graph of energy (rate or change or stress/energy) against dimension can be used to determine network and dynamical system dimensionality. The graph of stress/energy against dimensionality is traditionally called a scree plot. The use and purpose of the scree plot is greatly extended in the present embodiment of the tool 100.

Let $S=\{S_k\}$ be a collection of data sets or sources $S_k$ for $k=1, \ldots, m$. Step 110 of the tool 100 converts each $S_k \in S$ to matrix form $M(S_k)$ where $M(S_k)$ is a p dimensional real hollow symmetric matrix. Hollow means the diagonal entries of $M(S_k)$ are zero. As indicated above, $M(S_k)$ need not be symmetric or hollow, but for simplicity of exposition these additional restrictions are adopted. Note also that the matrix dimensionality p is a function of the data S and the goal of the analysis. Since $M(S_k)$ is hollow symmetric, it can be interpreted and processed in IDMDS as a proximity (dissimilarity) matrix. Step 110 can be represented by the map $$M: S \to H^p(R),$$
$$S_k \to M(S_k)$$

where $H^p(R)$ is the set of p dimensional hollow real symmetric matrices. The precise rule for computing M depends on the type of data in S, and the purpose of the analysis. For example, if S contains time series data, then M might entail the straightforward entry-wise encoding mentioned above. If S consists of optical character recognition data, or some other kind of geometric data, then $M(S_k)$ may be a standard distance matrix whose ij-th entry is the Euclidean distance between "on" pixels i and j. M can also be combined with other transformations to form the composite, $(M \circ F)(S_k)$, where F, for example, is a fast Fourier transform (FFT) on signal data $S_k$. To make this more concrete, in the examples below M will be explicitly calculated in a number of different ways. It should also be pointed out that for certain data collections S it is possible to analyze the conjugate or transpose S' of S. For instance, in data mining applications, it is useful to transpose records (clients) and fields (client attributes) thus allowing analysis of attributes as well as clients. The mapping M is simply applied to the transposed data.

Step 120 of the presently preferred embodiment of the tool 100 is the application of IDMDS to the set of input matrices $M(S)=\{M(S_k)\}$. Each $M(S_k) \in M(S)$ is an input source for IDMDS. As described above, the IDMDS output is a common space $Z \subset R^n$ and a source space W. The dimensionality n of these spaces depends on the input data S and the goal of the analysis. For signal data, it is often useful to set $n=p-1$ or even $n=|S_k|$ where $|S_k|$ denotes the cardinality of $S_k$. For data compression, low dimensional output spaces are essential. In the case of network reconstruction, system dimensionality is discovered by the invention itself.

IDMDS can be thought of as a constrained energy minimization process. As discussed above, the stress σ is an energy functional defined over transformations and configurations in $R^n$; the constraints are defined by the constraint equation $X_k=ZW_k$. IDMIDS attempts to find the lowest stress or energy configurations $X_k$ which also satisfy the constraint equation. (MDS is the special case when each $W_k=I$, the identity matrix.) Configurations $X_k$ most similar to the source matrices $M(S_k)$ have the lowest energy. At the same time, each $X_k$ is required to match the common space Z up to deformation defined by the weight matrices $W_k$. The common space serves as a characteristic, or reference object. Differences between individual configurations are expressed in terms of this characteristic object with these differences encoded in the weight matrices $W_k$. The deformation information contained in the weight matrices, or, equivalently, in the weight vectors defined by their diagonal entries, becomes the signature of the configurations $X_k$ and hence the sources $S_k$ (through $M(S_k)$). The source space may be thought of as a signature classification space.

The weight space signatures are contextual; they are defined with respect to the reference object Z. The contextual nature of the source deformation signature is fundamental. As the polygon classification example below will show, Z-contextuality of the signature allows the tool 100 to display integrated unsupervised machine learning and generalization. The analyzer/classifier learns seamlessly and invisibly. Z-contextuality also allows the tool 100 to operate without a priori data models. The analyzer/classifier constructs its own model of the data, the common space Z.

Step 130, the back end of the tool 100, decodes and interprets the source or classification space output W from IDMDS. Since this output can be high dimensional, visualization techniques must be supplemented by analytic methods of interpretation. A dye-dropping or tracer technique has been developed for both visual and analytic postprocessing. This entails differential marking or coloring of source space output. The specification of the dye-dropping is contingent upon the data and overall analysis goals. For example, dye-dropping may be two-color or binary allowing separating hyperplanes to be visually or analytically determined. For an analytic approach to separating hyperplanes using binary dye-dropping see Bosch, R. and Smith, J, "Separating hyperplanes and the authorship of the disputed federalist papers," *American Mathematical Monthly,* Vol. 105, 1998. Discrete dye-dropping allows the definition of generalized gravitational clustering measures of the form $$g_p(A, x) = \frac{\sum_{y \neq x} \chi_A(x) \exp(p \cdot d(x, y))}{\sum_{y \neq x} \exp(p \cdot d(x, y))}.$$

Here, A denotes a subset of W (indicated by dye-dropping), $\chi_A(x)$, is the characteristic function on A, $d(\cdot, \cdot)$ is a distance function, and $p \in R$. Such measures may be useful for estimating missing values in data bases. Dye-dropping can be defined continuously, as well, producing a kind of height function on W. This allows the definition of decision surfaces or volumetric discriminators. The source space W is also analyzable using standard cluster analytic techniques. The precise clustering metric depends on the specifications and conditions of the IDMDS analysis in question.

Finally, as mentioned earlier, the stress/energy and rate of change of stress/energy can be used as postprocessing tools. Minima or kinks in a plot of energy, or the rate of change of energy, over dimension can be used to determine the dimensionality of complex networks and general dynamical systems for which only partial output information is available. In fact, this technique allows dimensionality to be inferred often from only a single data stream of time series of observed data.

A number of examples are presented below to illustrate the method and apparatus in accordance with the present invention. These examples are illustrative only and in no way limit the scope of the method or apparatus.

EXAMPLE A

Classification of Regular Polygons

The goal of this experiment was to classify a set of regular polygons. The collection $S=\{S_1, \ldots, S_{16}\}$ with data sets $S_1$–$S_4$, equilateral triangles; $S_5$–$S_8$, squares; $S_9$–$S_{12}$, pentagons; and $S_{13}$–$S_{16}$; hexagons. Within each subset of distinct polygons, the size of the figures is increasing with the subscript. The perimeter of each polygon $S_k$ was divided into 60 equal segments with the segment endpoints ordered clockwise from a fixed initial endpoint. A turtle application was then applied to each polygon to compute the Euclidean distance from each segment endpoint to every other segment endpoint (initial endpoint included). Let $x_{S_k}^i$ denote the i-th endpoint of polygon $S_k$, then the mapping M is defined by $$M: S \to H^{60}(R),$$

$$S_k \mapsto [d_{S_k}^1 | d_{S_k}^2 | \ldots | d_{S_k}^{60}]$$

where the columns $$d_{S_k}^i = (d(X_{S_k}^i, X_{S_k}^1), d(X_{S_k}^i, X_{S_k}^2), \ldots, d(X_{S_k}^i, X_{S_k}^{60}))^t.$$

The individual column vectors $d_{S_k}^i$ have intrinsic interest. When plotted as functions of arc length they represent a geometric signal which contains both frequency and spatial information.

The 16, 60×60 distance matrices were input into a publicly distributed version of PROXSCAL. PROXSCAL was run with the following technical specifications: sources—16, objects—60, dimension—4, model— weighted, initial configuration— Torgerson, conditionality— unconditional, transformations— numerical, rate of convergence—0.0, number of iterations—500, and minimum stress—0.0.

Figure 2:
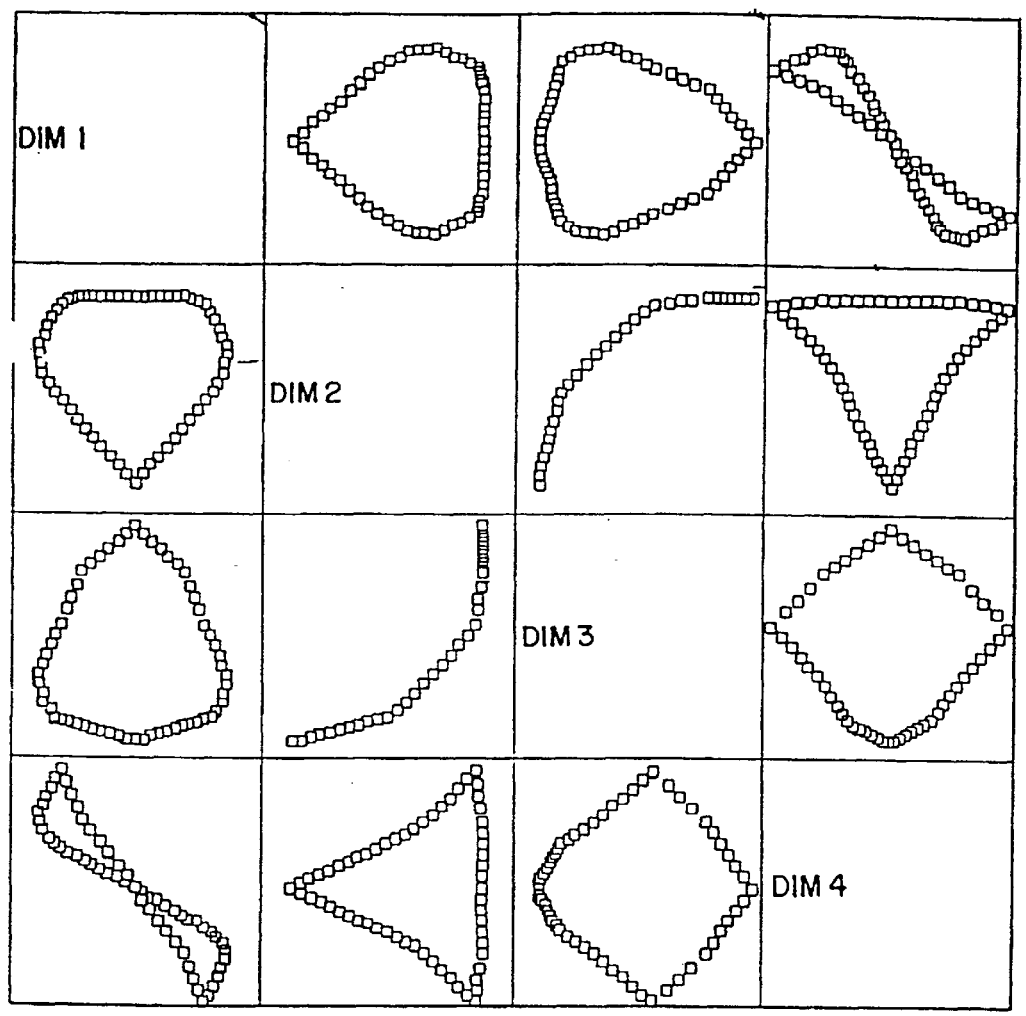
Figure 3:
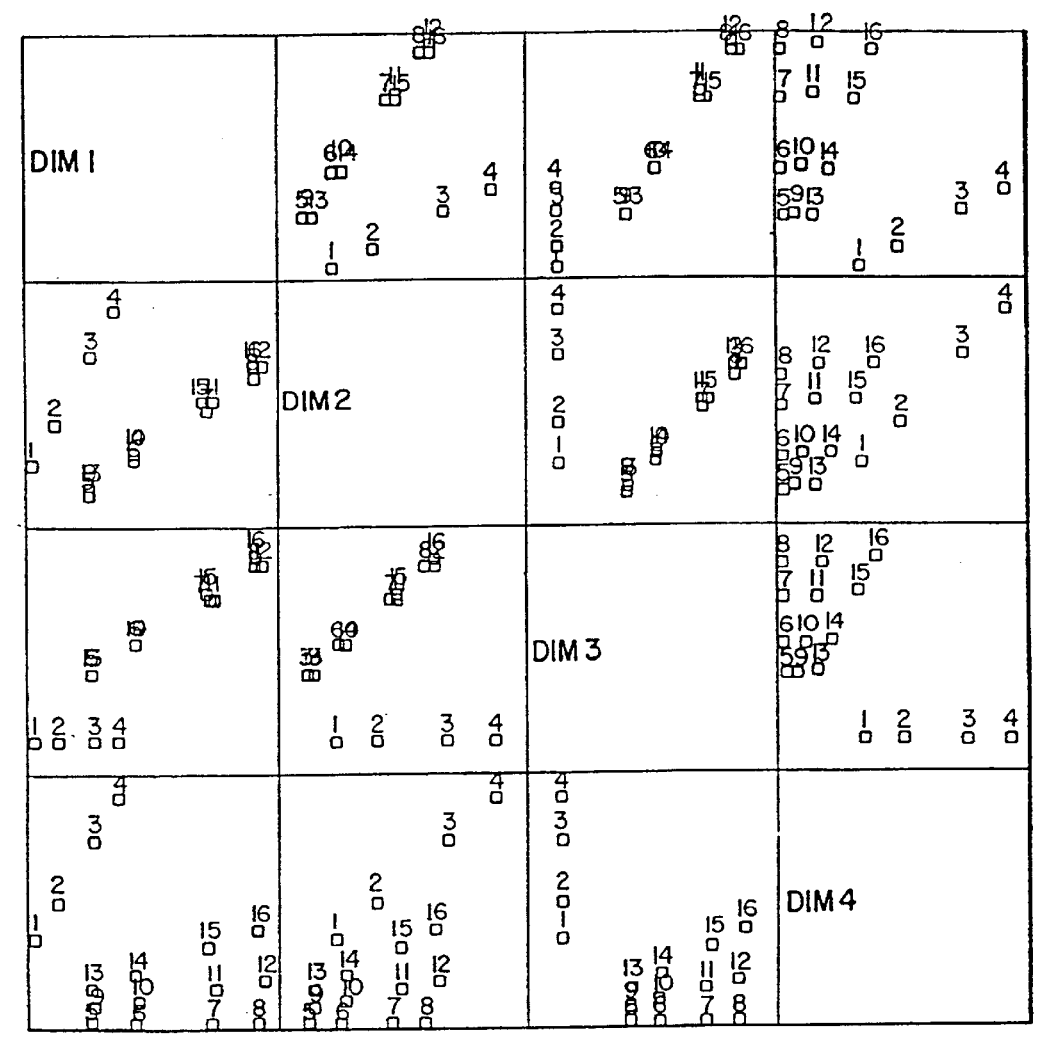

FIG. 2 and FIG. 3 show the four dimensional common and source space output. The common space configuration appears to be a multifaceted representation of the original polygons. It forms a simple closed path in four dimensions which, when viewed from different angles, or, what is essentially the same thing, when deformed by the weight matrices, produces a best, in the sense of minimal energy, representation of each of the two dimensional polygonal figures. The most successful such representation appears to be that of the triangle projected onto the plane determined by dimensions 2 and 4.

In the source space, the different types of polygons are arranged, and hence, classified, along different radii. Magnitudes within each such radial classification indicate polygon size or scale with the smaller polygons located nearer the origin.

The contextual nature of the polygon classification is embodied in the common space configuration. Intuitively, this configuration looks like a single, carefully bent wire loop. When viewed from different angles, as encoded by the source space vectors, this loop of wire looks variously like a triangle, a square, a pentagon, or a hexagon.

EXAMPLE B

Classification of Non-regular Polygons

The polygons in Example A were regular. In this example, irregular polygons $S=\{S_1, \ldots, S_6\}$ are considered, where $S_1$–$S_3$ are triangles and $S_4$–$S_6$ rectangles. The perimeter of each figure $S_k$ was divided into 30 equal segments with the preprocessing transformation M computed as in Example A. This produced 6, 30×30 source matrices which were input into PROXSCAL with technical specifications the same as those above except for the number of sources, 6, and objects, 30.

Figure 4:
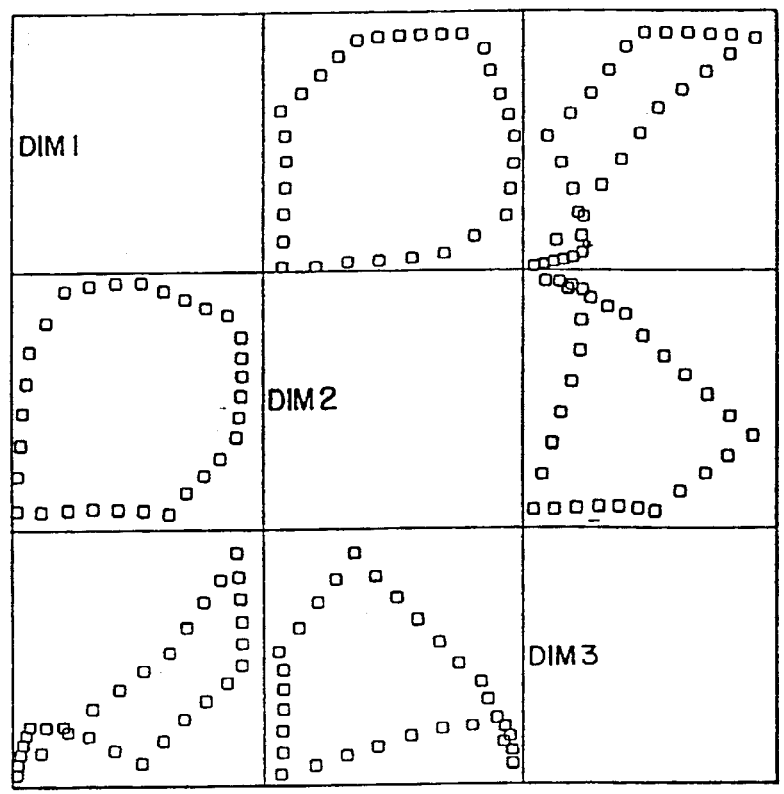
Figure 5:
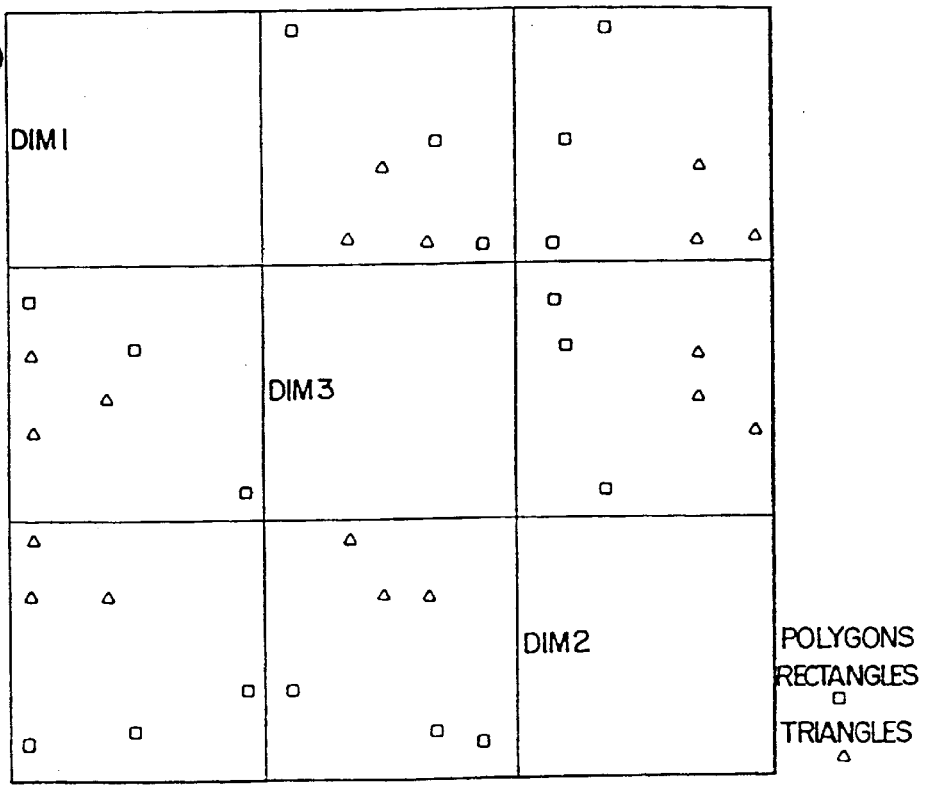

FIG. 4 and FIG. 5 show the three dimensional common and source space outputs. The common space configuration, again, has a "holographic" or faceted quality; when illuminated from different angles, it represents each of the polygonal figures. As before, this change of viewpoint is encoded in the source space weight vectors. While the weight vectors encoding triangles and rectangles are no longer radially arranged, they can clearly be separated by a hyperplane and are thus accurately classified by the analysis tool as presently embodied.

It is notable that two dimensional IDMDS outputs were not sufficient to classify these polygons in the sense that source space separating hyperplanes did not exist in two dimensions.

EXAMPLE C

Time Series Data

This example relates to signal processing and demonstrates the analysis tool's invariance with respect to phase and frequency modification of time series data. It also demonstrates an entry-wise approach to computing the preprocessing transformation M.

The set $S=\{S_1, \ldots, S_{12}\}$ consisted of sine, square, and sawtooth waveforms. Four versions of each waveform were included, each modified for frequency and phase content. Indices 1–4 indicate sine, 5–8 square, and 9–12 sawtooth frequency and phase modified waveforms. All signals had unit amplitude and were sampled at 32 equal intervals x, for $0 \leq x \leq 2\pi$.

Each time series $S_k$ was mapped into a symmetric matrix as follows. First, an "empty" nine dimensional, lower triangular matrix $T_k = (t_{ij}^k) = T(S_k)$ was created. "Empty" meant that $T_k$ had no entries below the diagonal and zeros everywhere else. Nine dimensions were chosen since nine is the smallest positive integer m satisfying the inequality $m(m-1)/2 \geq 32$ and $m(m-1)/2$ is the number of entries below the diagonal in an m dimensional matrix. The empty entries in $T_k$ were then filled in, from upper left to lower right, column by column, by reading in the time series data from $S_k$. Explicitly: $S_1^k = t_{21}^k$, the first sample in $S_k$ was written in the second row, first column of $T_k$; $S_2^k = t_{31}^k$, the second sample in $S_k$ was written in the third row, first column of $T_k$, and so on. Since there were only 32 signal samples for 36 empty slots in $T_k$, the four remaining entries were designated missing by writing −2 in these positions (These entries are then ignored when calculating the stress). Finally, a hollow symmetric matrix was defined by setting $$M(S_k) = T_k + T_k^t.$$

This preprocessing produced 12, 9×9 source matrices which were input to PROXSCAL with the following technical specifications: sources—12, objects—9, dimension—8, model—weighted, initial configuration—Torgerson, conditionality—unconditional, transformations—ordinal, approach to ties—secondary, rate of convergence—0.0, number of iterations—500, and minimum stress—0.0. Note that the data, while metric or numeric, was transformed as if it were ordinal or nonmetric. The use of nonmetric IDMDS has been greatly extended in the present embodiment of the tool 100.

Figure 6:
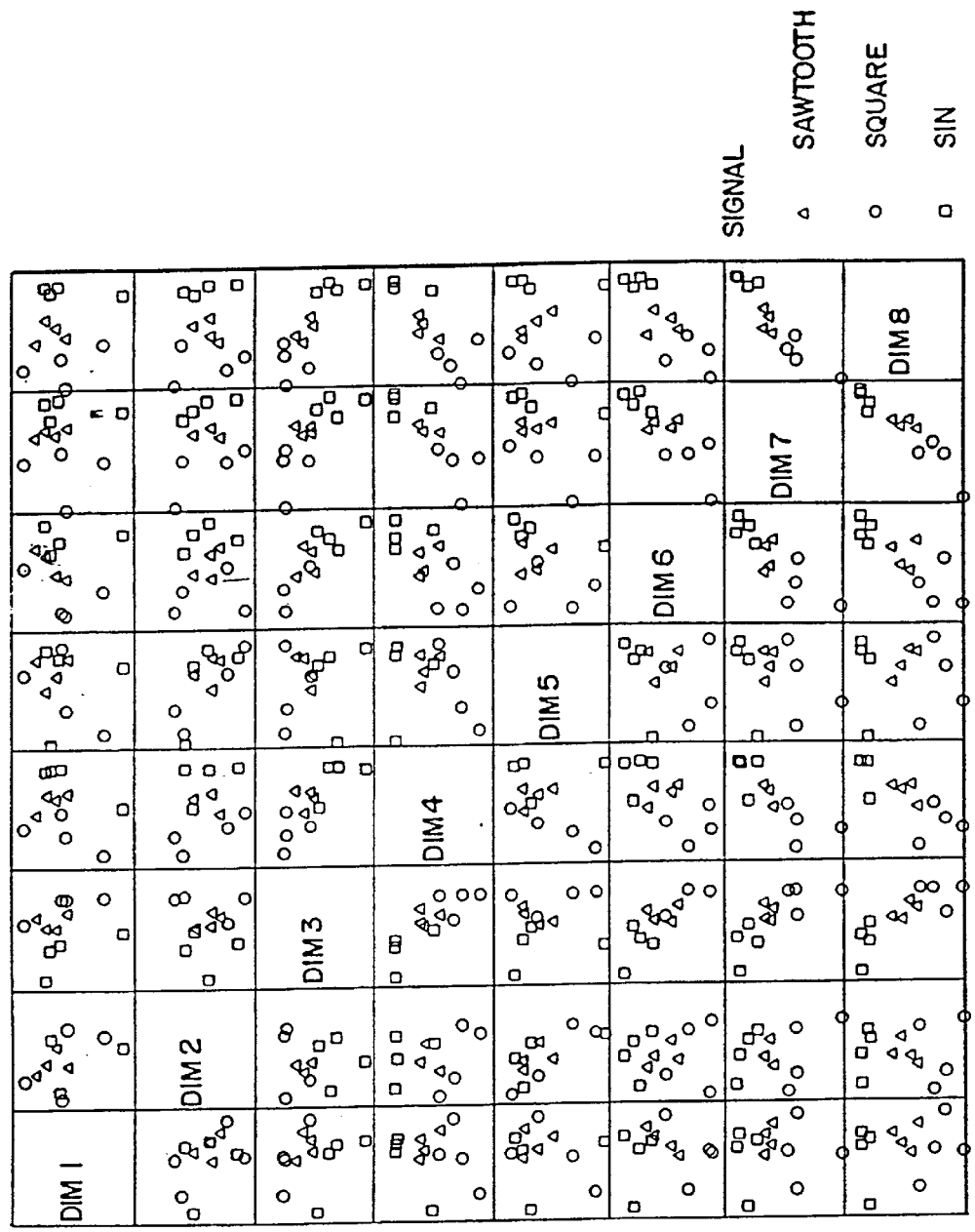

FIG. 6 shows the eight dimensional source space output for the time series data. The projection in dimensions seven and eight, as detailed in FIG. 7, shows the input signals are separated by hyperplanes into sine, square, and sawtooth waveform classes independent of the frequency or phase content of the signals.

EXAMPLE D

Sequences, Fibonacci, etc.

Figures 7, 8:
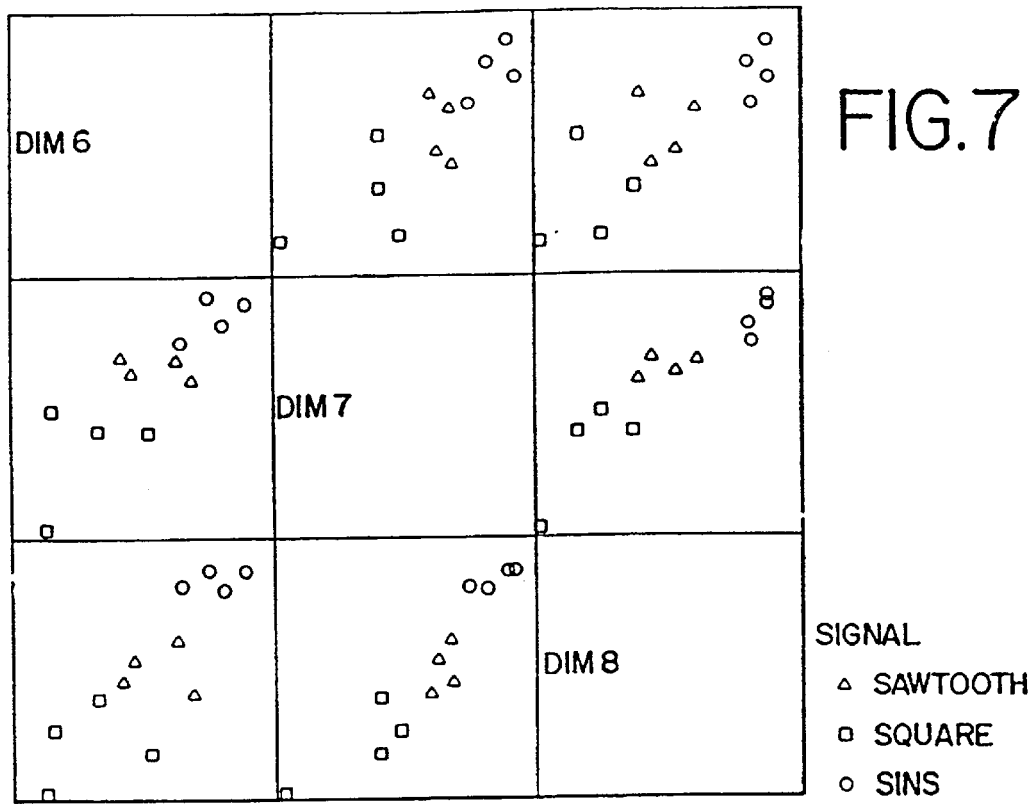

The data set $S=\{S_1, \ldots, S_9\}$ in this example consisted of nine sequences with ten elements each; they are shown in Table 1, FIG. 8. Sequences 1–3 are constant, arithmetic, and Fibonacci sequences respectively. Sequences 4–6 are these same sequences with some error or noise introduced. Sequences 7–9 are the same as 1–3, but the negative 1's indicate that these elements are missing or unknown.

The nine source matrices $M(S_k)=(m_{ij}^k)$ were defined by $$m_{ij}^k = |s_i^k - s_j^k|,$$

the absolute value of the difference of the i-th and j-th elements in sequence $S_k$. The resulting 10×10 source matrices where input to PROXSCAL configured as follows: sources—9, objects—10, dimension—8, model—weighted, initial configuration—simplex, conditionality—unconditional, transformations—numerical, rate of convergence—0.0, number of iterations—500, and minimum stress—0.0.

Figures 9, 10:
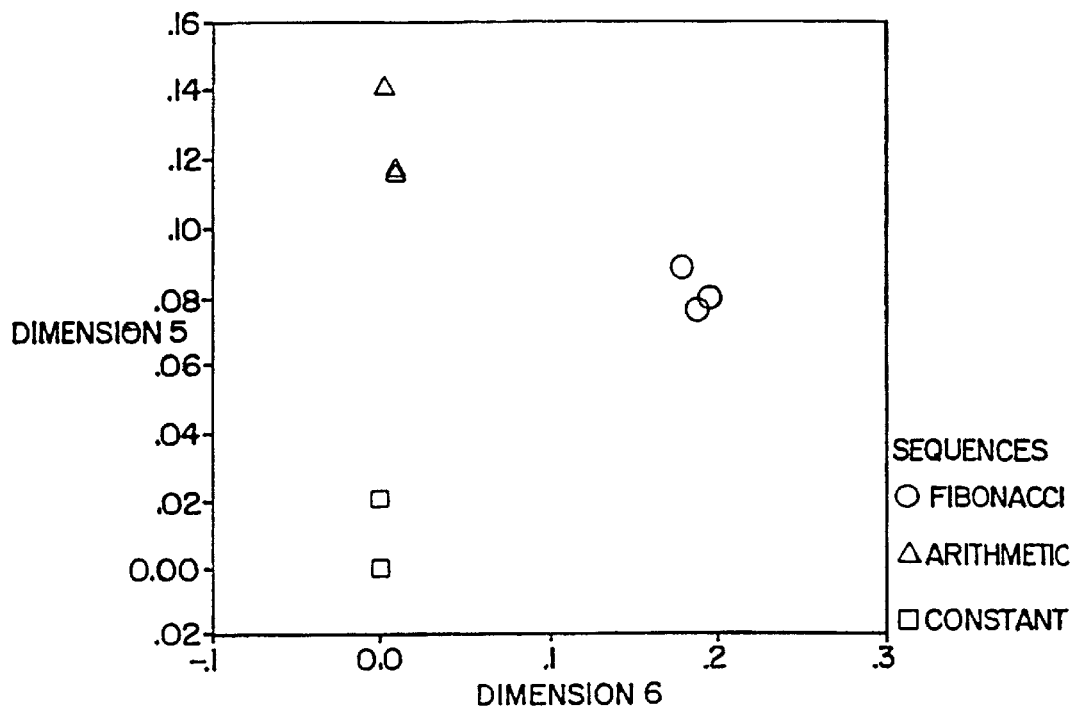

FIG. 9 shows dimensions 5 and 6 of the eight dimensional source space output. The sequences are clustered, hence classified, according to whether they are constant, arithmetic, or Fibonacci based. Note that in this projection, the constant sequence and the constant sequence with missing element coincide, therefore only two versions of the constant sequence are visible. This result demonstrates that the tool 100 of the presently preferred embodiment can function on noisy or error containing, partially known, sequential data sets.

EXAMPLE E

Missing Value Estimation for Bridges

This example extends the previous result to demonstrate the applicability of the analysis tool to missing value estimation on noisy, real-world data. The data set consisted of nine categories of bridge data from the National Bridge Inventory (NBI) of the Federal Highway Administration. One of these categories, bridge material (steel or concrete), was removed from the database. The goal was to repopulate this missing category using the technique of the presently preferred embodiment to estimate the missing values.

One hundred bridges were arbitrarily chosen from the NBI. Each bridge defined an eight dimensional vector of data with components the NBI categories. These vectors were preprocessed as in Example D, creating one hundred 8×8 source matrices. The matrices were submitted to PROXSCAL with specifications: sources—100, objects—8, dimension—7, model—weighted, initial configuration—simplex, conditionality—unconditional, transformations—numerical, rate of convergence—0.0, number of iterations—500, and minimum stress—0.00001.

The seven dimensional source space output was partially labeled by bridge material-an application of dye-dropping—and analyzed using the following function $$g_p(A_i, x) = \frac{\sum_{y \neq x} \chi_{A_i}(x) \cdot d(x,y)^{-p}}{\sum_{y \neq x} (x,y)^{-p}}$$

where p is an empirically determined negative number, $d(x,y)$ is Euclidean distance on the source space, and $\chi A_i$ is the characteristic function on material set $A_i$, i=1,2, where $A_1$ is steel, $A_2$ concrete. (For the bridge data, no two bridges had the same source space coordinates, hence $g_p$ was well-defined.) A bridge was determined to be steel (concrete) if $g_p(A_1,x) > g_p(A_2, x)$ ($g_p(A_1, x) < g_p(A_2, x)$). The result was indeterminate in case of equality.

The tool 100 illustrated in FIG. 1 estimated bridge construction material with 90 percent accuracy.

EXAMPLE F

Network Dimensionality for a 4-node Network

This example demonstrates the use of stress/energy minima to determine network dimensionality from partial network output data. Dimensionality, in this example, means the number of nodes in a network.

A four-node network was constructed as follows: generator nodes 1 to 3 were defined by the sine functions, sin (2x), sin ( 2x+π/2), and sin (2x+4π/3); node 4 was the sum of nodes 1 through 3. The output of node 4 was sampled at 32 equal intervals between 0 and 2π.

The data from node 4 was preprocessed in the manner of Example D: the ij-th entry of the source matrix for node 4 was defined to be the absolute value of the difference between the i-th and j-th samples of the node 4 time series. A second, reference, source matrix was defined using the same preprocessing technique, now applied to thirty two equal interval samples of the function sin (x) for $0 \leq x \leq 2\pi$. The resulting 2, 32×32 source matrices were input to PROXSCAL with technical specification: sources—2, objects—32, dimension—1 to 6, model—weighted, initial configuration—simplex, conditionality—conditional, transformations—numerical, rate of convergence—0.0, number of iterations—500, and minimum stress—0.0. The dimension specification had a range of values, 1 to 6. The dimension resulting in the lowest stress/energy is the dimensionality of the underlying network.

Table 2, FIG. 10, shows dimension and corresponding stress/energy values from the analysis by the tool 100 of the 4-node network. The stress/energy minimum is achieved in dimension 4, hence the tool 100 has correctly determined network dimensionality. Similar experiments were run with more sophisticated dynamical systems and networks. Each of these experiments resulted in the successful determination of system degrees of freedom or dimensionality. These experiments included the determination of the dimensionality of a linear feedback shift register. These devices generate pseudo-random bit streams and are designed to conceal their dimensionality.

The techniques described above may be further applied to fusion or merging of data. Data or sensor fusion or merging is the combining of disparate data, possibly from a variety of sources or sensors, into a meaningful representative form. Preferably, the result is a data point or set of data which can readily be displayed or used for comparison by both human and machine users of the system. In particular, the techniques above are extended below to the merging of ordinal data. Ordinal data is data which defines an ordering or ranks data in some order. For data measured below the ratio scale, the merging process described here entails the conversion of such data to the ratio measurement level.

The basic idea behind using an energy minimization approach for ordinal data merging is to treat data sets as relationally linked, deformable configurations. Each data set defines a matrix of lengths (a length matrix) encoding relational structure both within and between data sets. In the case of ordinal data sets, such "lengths" are defined only up to ordering where the order is a (global) relation on the set of all data sets. Using a variational principle, the technique described herein monotonically fuses or merges the configurations representing the data sets and measures the configuration by configuration deformation produced by this fusion. This measure of deformation is a vector with scalar components defining the fused or merged signature for each data set. The dimension of this fusion vector depends, in part, on the level of compression or fusion required of the data. Taken together, these fusion vectors define a pyramid-like merging structure for each data set.

The fusion or merging process is essentially an instantiation of the general three step process described above in conjunction with FIG. 1. The data fusion method includes a front end or preprocessing step, step 110, a processing step, step 120, and a back end, step 130. The front end entails the creation of the length matrices. The process step, in the illustrated embodiment, entails the application of individual differences multidimensional scaling (IDMDS) to the length matrices. The back end is simply the recording of the merging, fusion vectors associated to the data sets. These are the weight vectors which are the contextual signatures described above in connection with step 120 of the tool 100 (FIG. 1). The merging process may be iterated over dimension resulting in fusion vectors of increasing dimensionality. These vectors can be assembled into pyramid-like structures with the apexes of these merging pyramids the fused scalar values for each data set. Finally, a single scalar value may be generated by computing the norm of a merging vector.

Let $S=\{S_k\}$ be a collection of data sets $S_k$ where $k=1, \ldots, m$. For simplicity, in what follows the $S_k$ are assumed to be vectors with the same dimension n for all k. The merging process is applicable, however, to very general data structures such as matrices. A matrix is a specific type of data structure. Further, a lower triangular matrix as described herein and as known in the art is another type of data structure. It is to be understood that in alternative embodiments, the input data may be arranged as other data structures. Further, the illustrated embodiment is directed toward fusion or merging of ordinal data. The ordinal data contain ranking or rating information. More specifically, the ordinal data comprise ranking or rating values for a predetermined characteristic among the n input domains. It is to be understood that the described data merging process will have many applications with other types of data and may be readily adapted to such applications. Other types of data include nominal data, ratio data and interval data. The techniques described herein in conjunction with processing ordinal data may be suitably applied to other types of data such as those enumerated herein.

The data merging process applied to S consists of three steps: The first step corresponds to the front end, illustrated in FIG. 1 as step 110. The $S_k$ are loaded into "empty" lower triangular length matrices $T_k=(t_{ij}^k)=T(S_k)$. Here, "empty" means that initially $T_k$ has no entries below the diagonal and zeros everywhere else. Since the $S_k$ have dimension n, that is, n components, the matrices $T_k$ have dimension the smallest positive integer l satisfying the inequality $l(l-1)2 \geq n$ (since $l(l-1)/2$ is the number of entries below the diagonal in an l dimensional matrix). The empty entries in $T_k$ are filled in, from upper left to lower right, column by column, by reading in the components of $S_k$. For example: $s_1^k=t_{21}^k$, the first sample in $S_k$ is written in the second row, first column of $T_k$; $s_2^k=t_{21}^k$, the second sample in $S_k$ is written in the third row, first column of $T_k$, and so on. In this way, the components of $S_k$ define lengths or distances in the matrix $T_k$. (Note, as in Example B above, the $T_k$ also define hollow symmetric matrices $T_k+T_k^i$.) If the number of components n is less than the number of available entries in the l dimensional matrix $T_k$, then $S_k$ is augmented with dummy or artificial values to fill the remaining matrix entries. The manner of augmentation is described in more detail below. It should be pointed out that there are many ways to populate the matrix $T_k$ with entries from the data sets $S_k$. For example, any consistently applied permutation of the $S_k$ can produce $T_k$. The method described here is not special in any way and any other consistent approach can be used to create the $T_k$.

The matrix $T_k$ may be likened to a drive table which shows travel distances between a group of cities on a map. The cities are listed across the top and along the left edge of the drive table. Each entry in the drive table lists a distance from the city corresponding to the current column to the city corresponding to the current row. The diagonal of the drive table is empty or has all zero values, because those entries correspond to the distance from a city to itself. The upper half of the drive table, above the diagonal, is omitted as being redundant with the lower half. Thus, each entry in the matrix $T_k$, which is nominally a rating or a ranking of some predetermined characteristic among a plurality of input domains, is treated by the illustrated process as a length or distance, but where these lengths or distances are only determined up to the ordering of the original data. Of course, in the present context there are no objects to instantiate the cities in the above drive table, that is, there are no known objects whose interpoint proximity give the ordinal values in the data sets $S_k$.

In the second step of the data merging process, illustrated in FIG. 1 as step 120, the $T_k$ are processed using IDMDS in $d=1, \ldots, r$ dimensions ($d=1$, produces a scalar merging) where r is either automatically determined or is set by the user. IDMDS is the variational principle underlying the illustrated embodiment of the data merging process. Other suitable energy minimization methods now known or developed in the future may be used. If the $S_k$ are vectors of ordinal data then non-metric IDMDS is used in the processing step. The result of the IDNMDS processing is at least a source space, as described above.

For the third step of the data merging process, illustrated in FIG. 1 as step 130, the source space output of the IDMDS or other energy minimization process is used to interpret the data. The IDMDS source space output from step 120 contains nonnegative merged or fusion vectors $w_k \in R_+^d$ for $k=1, \ldots, m$ and $d=1, \ldots, r$ (here, $R_+^d$ denotes the positive orthant of d dimensional Euclidean space) If a range of merging dimensions has been selected for each data set, then these fusion vectors can be assembled into a pyramid structure. That is, if a single merging dimension has been selected, the output will have the form of one or more scalar values. If a two dimensional merging has been selected, the output will be a 2 component vector which when stacked above the 1 dimensional scalar output produces a typographic inverted V. If a three or more dimension merging has been selected, the output will have the form of a flat pyramid with the scalar one dimensional value at the apex. Different dimensionalities provide different ways to view the output of the process. For particular data, a particular back end process may prove advantageous. For example, a scalar merging value can be produced either by restricting the source space output to be one dimensional or by taking the (Euclidean) norm of higher dimensional source space vectors. In the presently preferred embodiment of the invention, an advantage to using the magnitude or norm of higher dimensional fusion vectors is the increased likelihood that the IDMDS process has converged to a global minimum of the stress function. In fact, dimension d=l−1 is optimal in this regard. Selection of a particular back end process is well within the skill of those ordinarily skilled in the art.

The above merging process can be generalized and augmented in a number of ways. In one alternative embodiment, the merging process can be generalized by allowing for weights on the entries of the length matrices $T_k$. For example, by transposing the data S,—in other words, by considering the rows of the matrix $S=(S_1|S_2|\ldots|S_m)$, with columns $S_k$—and applying the above process (or more generally, an energy minimization process) to the row vectors, a weight can be associated with each component of the vectors $S_k$. Specifically, applying the invention as described above to the transposed data produces a scalar merged value $c_i$, i=1, ..., n, for each input domain (row) in S. The $T_k$ matrix constructed from the vector of merged values $c=(c_1, \ldots c_n)$ defines proximity weights $w_{ij}^k = t_{ij}^k$ for the general IDMDS stress function (note that the $T_k$ are identical for all k). These weights can then be imposed in the processing step 120, resulting in a weighted merging on the vectors $S_k$. Of course, weights can also be supplied a priori or through some other procedure. The process described earlier is simply the special weighted merging with all weights equal to 1.

In another alternative embodiment, in the preprocessing step 110, the data $S_k$ may be augmented with artificial values. For instance, the $S_k$ may be consistently augmented with missing values, repeated constants, or random values. The $S_k$ may also be augmented through concatenation of copies of the data values themselves; a process called replication. Augmentation of the $S_k$ allows energy minimization merging to be applied to data sets of differing cardinality and with missing values. Moreover, by increasing the number of IDMDS objects, $S_k$ augmentation improves IDMDS avoidance of local minima by allowing for higher dimensional classification spaces.

In the preprocessing step 110 as described above is adapted to data which is non-metric or ordinal. In cases where this is not a constraint, there are many other approaches to the creation of matrix inputs to the energy minimizing process. These are detailed in PCT international application number PCT/US98/27374, filed Dec. 23, 1998 and designating the United States, which is incorporated herein by reference. For both nonmetric and metric data, it is also possible to work with asymmetric length matrix encodings. Of course, for asymmetric matrices it is no longer possible to think of matrix entries as lengths or distances This does not effect the merging process.

In sum, the data or sensor fusion process described herein may be visualized by imagining a deformable crystal having a number of edges greater than or equal to the number of input domains in the input data sources or sensors. For ordinal data, each input domain corresponds to a predetermined ordinally valued characteristic. The lengths of the edges of the crystal correspond to the length data produced from the input data. If the data to be fused is ordinal then the lengths correspond to those ordered ratings, rankings or other values of the predetermined characteristic. An energy minimization process such as IDMDS forces the crystal into a common shape, along with other crystals with the same (or possibly other) input domains. The lengths of each edge can contract or expand as the crystal deforms, where, in the case of ordinal data, this deformation is constrained to be isotonic with respect to the original ordering on the lengths. This deformation is a measure which is referred to as the fusion vector. The fusion vector may have one or more ratio scale components that characterize the data across several predetermined characteristics. The fusion vector is composed of ratio scale data and can be quantitatively manipulated.

From the foregoing, it can be seen that the illustrated embodiment of the present invention provides a method and apparatus for fusion or merging of input data. Input data are received and formed into one or more data structures which are matrices in the presently preferred embodiment or the invention. The matrices are processed using an energy minimization process such as IDMDS in the presently preferred embodiment to produce a an output such as a source space and a common space. An output or back end process uses analytical or visual methods to interpret the source space and the common space. This technique produces an output representative of the input ordinal data which is more manageable by the user and more readily permits cross comparison for differing data sources. The output data are ratio data rather than ordinal data, and are thus defined relative to some predetermined unit of measurement.

While a particular embodiment of the present invention has been shown and described, modifications may be made. For example, PROXSCAL is illustrated as one acceptable IDMDS routine for performing the energy minimization process. However, PROXSCAL may be replaced by other IDMDS routines which are commercially available or are proprietary. It is therefore intended in the appended claims to cover all such changes and modifications which fall within the true spirit and scope of the invention.

What is claimed is:

1. A data fusion method comprising the steps of:
   (a) receiving data; and
   (b) applying energy minimization to simultaneously produce a plurality of fusion vectors.

2. The data fusion method of claim 1 wherein step (b) comprises steps of:
   (b1) creating a plurality of data structures using the received data; and
   (b2) simultaneously producing the plurality of fusion vectors from the plurality of data structures.

3. The data fusion method of claim 2 wherein step (b1) comprises compressing the plurality of data structures to produce a new data structure, the new Jata structure having fewer elements than any data structure of the plurality of data structures.

4. The data fusion method of claim 2 wherein the plurality of data structures comprise two or more hollow symmetric matrices.

5. The data fusion method of claim 4 wherein the two or more matrices comprise hollow symmetric matrices filled with values of the received data.

6. A data fusion method comprising the steps of:
   (a) receiving data and transposing the received data to produce data structures;
   (b) applying energy minimization to the data structures to simultaneously produce a plurality of merged values;
   (c) constructing a matrix from the merged values to define a proximity weight matrix; and
   (d) applying individual differences multidimensional scaling to data structures derived from the received data and the proximity weight matrix to simultaneously produce a plurality of fusion vectors.

7. The data fusion method of claim 1 wherein the received data is ordinal or higher measurement level data.

8. The data fusion method of claim 1 wherein step (b) comprises applying individual differences multidimensional scaling to the data.

9. The data fusion method of claim 1 further comprising the steps of:
(c) taking norms of the plurality of fusion vectors.

10. A data fusion method comprising the steps of:
(a) receiving ordinal measurement level data;
(b) creating hollow symmetric matrices using the ordinal measurement level data;
(c) applying meaningful energy minimization to the matrices; and
(e) simultaneously producing a plurality of fusion vectors in response to the meaningful energy minimization.

11. The data fusion method of claim 10 wherein step (b) comprises the steps of:
(b1) entry-wise populating the hollow symmetric matrices with elements of a collection of sets containing the ordinal measurement level data.

12. The data fusion method of claim 11 further comprising the step of:
(b2) augmenting the data with artificial values.

13. The data fusion method of claim 12 wherein step (b2) comprises:
replacing one or more missing values of the data with artificial values.

14. The data fusion method of claim 12 wherein step (b2) comprises:
appending one or more artificial values to the data to completely fill the hollow symmetric matrices with elements of the collection of sets containing the ordinal measurement level data and the appended artificial values.

15. The data fusion method of claim 12 wherein the artificial values comprise randomly determined values.

16. The data fusion method of claim 12 wherein the artificial values comprise a repeated constant value.

17. The data fusion method of claim 10 wherein the ordinal measurement level data comprises ranking values for a predetermined characteristic among a plurality of input domains.

18. The data fusion method of claim 10 wherein the ordinal measurement level data comprises rating values for a predetermined characteristic among a plurality of input domains.

19. A data fusion process for data, the process comprising:
using individual differences multidimensional scaling with two or more input hollow symmetric matrices into which the data for fusion has been entered to produce at least a source space output; and
using the source space output to interpret the fused data.

20. A data fusion process comprising:
forming input hollow symmetric matrices with ordinal measurement level data;
applying a meaningful energy minimization process with the input hollow symmetric matrices to simultaneously produce at least a plurality of fusion vectors; and
interpreting the plurality of fusion vectors as indicative of data fusion.

21. The data fusion process of claim 20 wherein the forming step comprises the steps of:
receiving the ordinal measurement level data;
treating each ordinal measurement level datum as a proximity;
defining the input hollow symmetric matrices as non-redundant lower triangles of the hollow symmetric matrices of sufficient dimension to contain all the ordinal measurement level data; and
mapping consecutive ordinal measurement level data entry-wise into the non-redundant lower triangles of the hollow symmetric matrices.

22. The data fusion process of claim 21 wherein the ordinal measurement level data comprises ranking values for a predetermined characteristic among a plurality of input domains.

23. The data fusion process of claim 21 wherein the ordinal measurement level data comprises rating values for a predetermined characteristic among a plurality of input domains.

24. The data fusion process of claim 21 wherein the forming step comprises appending one or more artificial values to the data to completely fill the non-redundant lower triangles of the hollow symmetric matrices with the ordinal measurement level data and the artificial values.

25. The data fusion process of claim 20 wherein the meaningful energy minimization process comprises non-metric individual differences multidimensional scaling using the input hollow symmetric matrices, the data fusion process further comprising producing a source space output.

26. The data fusion process of claim 25 further comprising the steps of:
producing source space fusion vectors in the source space output; and
taking a norm of each of the source space fusion vectors.

27. The data fusion process of claim 20 wherein the forming step comprises the steps of:
receiving the data;
replicating the data; and
mapping consecutive replicated data entry-wise into the hollow symmetric matrices.

28. Computer executable software program code stored on a computer readable medium, the code for data fusion of input data, the code comprising:
first code that receives data and forms one or more data structures using the received data;
second code that applies an energy minimization process to the one or more data structures and simultaneously produces a plurality of fusion vectors; and
third code that uses the fusion vectors to provide user output information.

29. A method for data fusion, the method comprising the steps of:
receiving two or more sets of ordinal measurement level data, the ordinal measurement level data including ranking values for a predetermined characteristic among a plurality of input domains;
mapping the ordinal measurement level data into non-redundant lower triangles of two or more hollow symmetric matrices.
processing the hollow symmetric matrices using a meaningful energy minimization process to produce output data; and
processing the output data to provide fused data.

30. A method for data fusion comprising the steps of:
receiving two or more sets of ordinal measurement level data $S_k$, the ordinal measurement level data including ranking values for a predetermined characteristic among a plurality of input domains;
mapping the ordinal measurement level data into non-redundant lower triangles $T_k$ of two or more hollow symmetric matrices;

processing the matrices $T_k$ using a meaningful energy minimization process to produce output data, including
processing the two or more sets of ordinal data $S_k$ in the matrices $T_k$ as relationally linked deformable configurations to find a configuration corresponding to minimum energy, and
producing the output data associated with the configuration corresponding to minimum energy; and
processing the output data to provide fused data.

31. A data fusion process comprising:
receiving ordinal measurement level data;
transposing the received ordinal measurement level data;
writing the transposed ordinal measurement level data to two or more hollow symmetric matrices;
using energy minimization and the hollow symmetric matrices to produce a source space output;
using the source space output to produce a proximity weight matrix;
writing the received ordinal measurement level into two or more hollow symmetric matrices;
using meaningful energy minimization and the proximity weight matrix and the hollow symmetric matrices to produce a source space output; and
interpreting the source space output as an indicator of data fusion or merging.

32. A method for data merging, the method comprising the steps of:
receiving two or more sets of data;
mapping the received data into two or more hollow symmetric matrices;
processing the resulting hollow symmetric matrices using individual differences multidimensional scaling;
producing a source space of vectors; and
interpreting the source space vectors as indicators of data merging.

33. The data merging method of claim 32 wherein mapping the received data comprises mapping the received data entry-wise into the two or more hollow symmetric matrices.

34. The data merging method of claim 33 wherein mapping the received data comprises augmenting the received data with artificial values so as to fill the hollow symmetric matrices during the entry-wise mapping.

35. The data merging method of claim 33 wherein mapping the received data comprises treating empty entries in the hollow symmetric matrices during entry-wise mapping of the received data as missing values during processing of the hollow symmetric matrices using individual differences multidimensional scaling.

36. The data merging method of claim 32 further comprising the steps of:
varying the dimensionality of the source space; and
associating to each set of received data a set of source space vectors of varying dimensionality.

37. The data merging method of claim 32 further comprising the steps of:
taking a norm of each of the source space vectors; and
interpreting the norms of the source space vectors as merged values of the received sets of data.

38. A method for data merging, the method comprising the steps of:
receiving two of more sets of ordinal measurement level data;
mapping the ordinal measurement level data into two or more hollow symmetric matrices;
processing the resulting hollow symmetric matrices using non-metric individual differences multidimensional scaling;
producing a source space of vectors; and
interpreting the source space vectors as indicators of data merging.

39. The data merging method of claim 35 wherein the received ordinal measurement level data is mapped entry-wise into the hollow symmetric matrices.

40. The data merging method of claim 39 wherein the received ordinal measurement level data is augmented with artificial values so as to fill the hollow symmetric matrices under the entry-wise mapping.

41. The data merging method of claim 39 wherein empty entries in the hollow symmetric matrices under entry-wise mapping of the received data are treated as missing values under processing of the hollow symmetric matrices using non-metric individual differences multidimensional scaling.

42. The data merging method of claim 38 further comprising the steps of:
varying the source space dimensionality; and
associating to each set of received ordinal measurement level data a set comprised of source space vectors of varying dimensionality.

43. The data merging method of claim 38 further comprising the steps of:
taking a norm of each of the source space vectors; and
interpreting the norms of the source space vectors as fused or merged values of the sets of received ordinal measurement level data.

44. The data merging method of claim 43 wherein the source space vectors are interpreted as vectors comprised of ratio measurement level components.

45. The data merging method of claim 43 wherein the norms of the source space vectors are interpreted as ratio measurement level merged values.

46. A data fusion process for data, the process comprising:
using non-metric individual differences multidimensional scaling with two one or more input hollow symmetric matrices into which the data for fusion has been entered to produce at least a source space output; and
using the source space output to interpret the fused data.

47. The data fusion process of claim 46 further comprising the steps of:
prior to the step of using non-metric individual differences multidimensional scaling, receiving ordinal measurement level data; and
producing the two or more input hollow symmetric matrices from the ordinal measurement level data.

48. The data fusion process of claim 47 wherein the producing step comprises treating the ordinal measurement level data as proximity data for input to a non-metric individual differences multidimensional scaling process.

* * * * *

UNITED STATES PATENT AND TRADEMARK OFFICE
CERTIFICATE OF CORRECTION

| | | |
|---|---|---|
| PATENT NO. | : 6,968,342 B2 | Page 1 of 1 |
| APPLICATION NO. | : 09/885342 | |
| DATED | : November 22, 2005 | |
| INVENTOR(S) | : Abel Wolman et al. | |

It is certified that error appears in the above-identified patent and that said Letters Patent is hereby corrected as shown below:

In the Claims

Column 16, in claim 3, line 3, after "data structure, the new" delete "Jata" and substitute --data-- in its place.

Signed and Sealed this

Eighth Day of May, 2007

JON W. DUDAS
*Director of the United States Patent and Trademark Office*